J. F. O'CONNOR.
FRICTIONAL SHOCK ABSORBER FOR VEHICLES.
APPLICATION FILED SEPT. 2, 1915.
1,224,496.
Patented May 1, 1917.
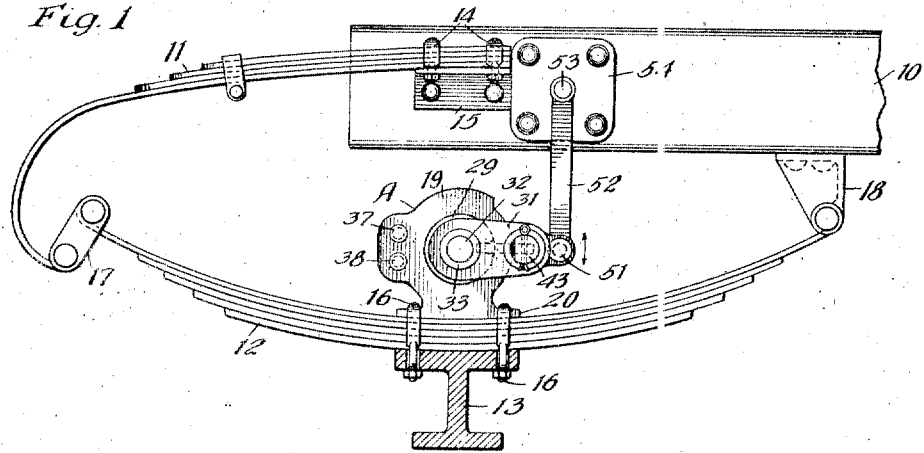
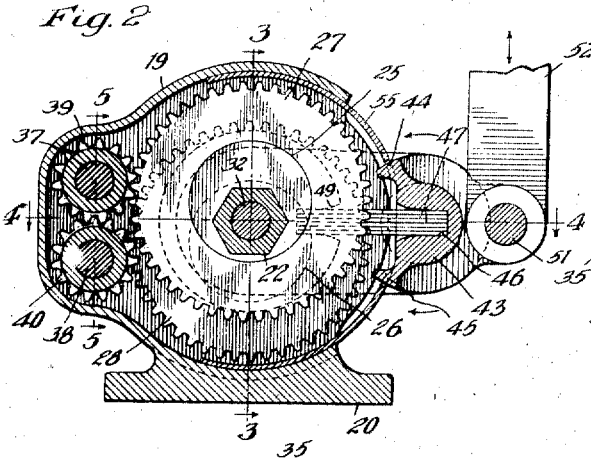
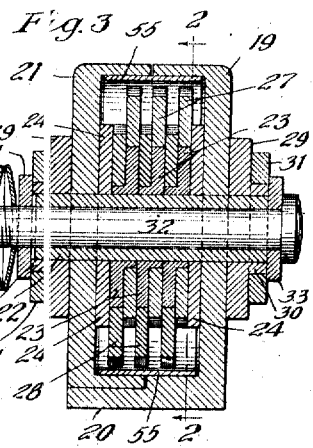
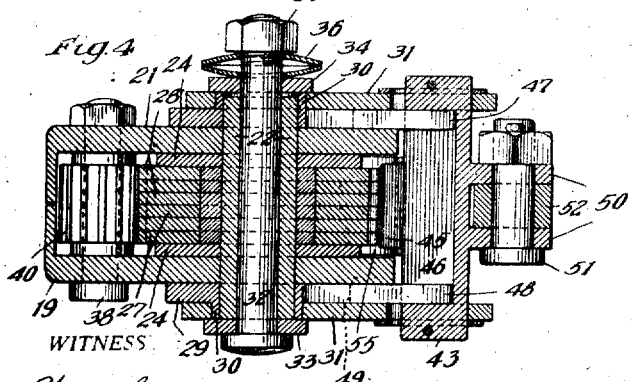
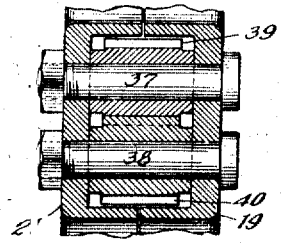
WITNESS
Wm. Geiger
INVENTOR.
John F. O'Connor
BY George D. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTIONAL SHOCK-ABSORBER FOR VEHICLES.

1,224,496.  Specification of Letters Patent.  Patented May 1, 1917.

Application filed September 2, 1915. Serial No. 48,565.

*To all whom it may concern:*

Be it known that I, JOHN F. O'CONNOR, a citizen of the United States, residing at Chicago, in the county of Cook and State of Illinois, have invented a certain new and useful Improvement in Frictional Shock-Absorbers for Vehicles, of which the following is a full, clear, concise, and exact description, reference being had to the accompanying drawings, forming a part of this specification.

This invention relates to improvements in frictional shock absorbers for vehicles.

An object of the invention is to provide a shock absorber for automobiles and other vehicles which employs a plurality of friction plates or equivalent members so actuated that a minimum amount of wear on the parts takes place, due to the constant shifting of the contacting wearing faces.

Another object of the invention is to provide a shock absorber of the character above indicated, so arranged that the degree of friction between the various elements may be adjusted to any desired amount.

In the drawing forming a part of this specification, Figure 1 is a side elevation of a portion of an automobile chassis and spring showing my improvement in connection therewith, the axle being in cross section. Fig. 2 is a vertical sectional view taken substantially on the line 2—2 of Fig. 3. Fig. 3 is a vertical sectional view taken at right angles to that of Fig. 2, the section being substantially on the line 3—3 of Fig. 2. Fig. 4 is a horizontal sectional view taken substantially on the line 4—4 of Fig. 2 and Fig. 5 is a sectional view taken substantially on the line 5—5 of Fig. 2.

In said drawing, 10 denotes a portion of the automobile chassis or frame, 11—12 a elliptical spring and 13 the axle. The quarter spring 11 is secured to the chassis 10 by means of clips 14 attached to the bracket 15, the latter being riveted to the chassis. The semi-elliptical spring 12 is secured to the axle by similar clips 16, the ends of the quarter and semi-elliptical springs being connected in the usual manner by the pivot link 17 and the opposite end of the semi-elliptical spring 12 is connected to a dependent bracket 18 riveted to the chassis 10. The foregoing described parts are or may be of any well known or desired type.

The improved shock absorbing mechanism comprises a casing designated generally by the reference A, said casing comprising a main member 19 having a base 20 by which it is secured on top of the spring 12 by said clips 16, and an adjustable cap 21. Extending transversely through the casing A substantially at the center thereof is a hexagonal rod 22 which passes through correspondingly shaped openings in the members 19 and 21, the ends of said rod being extended beyond the casing for a purpose hereinafter described. Within the casing A, and non-rotatably mounted on the rod 22 is a plurality of double eccentrics 23—23. Interposed between the end eccentrics 23 and the inner walls of the casing A are liner disks 24—24. Each eccentric 23 has one eccentric bearing 25, the center of which is above the center of the casing and another eccentric bearing 26, the center of which is below the center of the casing. Rotatably mounted on the plurality of eccentrics, above described, are toothed disks 27 and 28, it being understood that the number of said toothed disks 27 equal the number of toothed disks 28, one set rotating about one series of eccentrics 25 and the other set about the series of eccentrics 26. The toothed disks 27 and 28 have their surfaces engaging to thus create the friction when relatively rotated, as hereinafter described. On each side of the casing A are placed plates 29—29, the latter fitting the hexagonal rod 22, each of said plates 29 having also an outwardly extending boss 30 on which are oscillatably mounted levers 31—31. The parts of the casing A, the eccentrics, liners, friction disks 27 and 28, the plates 29—29, and levers 31—31, are all held in assembled position by means of a bolt 32 which extends through the hexagonal rod 22, a washer 33 being interposed between the head of the bolt and the adjacent members on one side of the casing and a second washer 34 being interposed between the adjustable nut 35 and adjacent members on the other side of the casing A. In order to regulate and adjust the amount of friction between the friction disks, a double leaf spring 36 is preferably interposed between the nut 35 and washer 34.

Also mounted within the casing A to one side of the friction disks 27 and 28 on bolts 37 and 38, are pinions 39 and 40. The pinion 39 on the upper bolt 37 meshes with the upper series of toothed friction disks 27 and the lower pinion 40 meshes with the lower set of toothed friction disks 28. Pivotally mounted in suitable recesses at the outer ends of the levers 31—31 is a transversely extending pawl 43, said pawl 43 having an upper elongated tooth 44 adapted to coöperate with the teeth of the upper series of disks 27, and a lower elongated tooth 45 adapted to coöperate with the teeth of the lower series of friction disks 28. Said pawl 43 on its inner side is also provided with an elongated recess 46 adapted to receive the outer ends of two series of springs 47 and 48, the inner ends of said series of springs being confined and held in suitable recesses 49—49 formed in the plates 29—29, it being understood that the recesses 49 and 46 are flared to thereby facilitate flexing of the springs as hereinafter described. On its outer side the pawl 43 is provided with a spaced pair of perforated ears 50—50 to which is pivotally connected, as by a bolt 51, a link 52, the upper end of which is pivotally connected as indicated at 53 to a suitable bracket 54 riveted to the chassis 10.

The operation is as follows:

It will be noted that the teeth 44 and 45 on the pawl are normally out of engagement with the teeth on the friction disks, so that initial relative movement either toward or from each other of the axle 13 and chassis 10 does not cause any movement of the friction disks. However, upon relative approach of the chassis 10 and axle 13 beyond a predetermined limit it is apparent that the pawl 43 will be oscillated clock-wise against the action of the springs 47 and 48. This will continue until the lower tooth 45 engages the teeth of the lower set of friction disks 28. Continued downward movement of the link 52 and pawl 43 with the tooth 45 in engagement with the teeth of the disks 28 will rotate the lower set of friction disks 28 in a clock-wise direction, this final movement of the pawl being permitted by the oscillation of the levers 31—31 about their supports. The clock-wise movement of the friction disks 28 will rotate the pinion 40 in a counter clock-wise direction and the latter in turn, which meshes with the pinion 39, will rotate the pinion 39 in a clock-wise direction. This rotation of the pinion 39 will in thrn rotate the friction disks 27 in a counter clock-wise direction. In practice, the number of teeth on the pinion 39 will differ from the number of teeth on the pinion 40, one having preferably 14 teeth and the other 15 teeth, hence, upon actuation of the friction members one set of friction disks will be rotated at a slightly higher speed than the other set whereby a constant variation of the engaging friction surfaces of the disks is obtained. When the axle and chassis separate more than a predetermined distance, the upper tooth 44 will engage the teeth of the disks 27 and rotate the latter in a counter clock-wise direction and, through the intermediary of the pinions 39 and 40, the disks 28 in a clock-wise direction.

From the foregoing, it is apparent that in whichever direction the pawl 43 is actuated, that is, either up or down, the disks 27 and 28 will always be rotated in the same direction to effect the constant change of the friction engaging surfaces.

In order to protect the members within the casing from dirt and the elements I provide a sheet metal cage 55 which fits therewithin and is movable with the pawl 43.

I claim:

1. A shock absorber for vehicles and the like comprising, a casing adapted to be secured to one member of the vehicle, two sets of friction disks carried by said casing, and means for turning one set of disks in one direction relatively to the casing, and the other set of disks always in the opposite direction relatively to said casing, upon relative movements of the vehicle member to which the casing is adapted to be secured and another member of the vehicle.

2. A shock absorber for vehicles comprising, a casing, two sets of friction disks carried by said casing, one set of disks being rotatable about centers eccentric to the centers of rotation of the other set of disks, and means for actuating one set of disks always in the same direction.

3. In a device of the character described, the combination with two members of a vehicle adapted to move toward and from each other, of a shock absorber, said shock absorber comprising, a casing secured to one of said members, two sets of friction disks carried by said casing, said disks having peripheral teeth, both sets being rotatable with respect to the casing, one set in one direction and the other set in the opposite direction, pawl means coöperating with the teeth of said disks, and devices for actuating said pawl means upon relative movement between said members of the vehicle.

4. In a device of the character described, the combination with two members of a vehicle adapted to move toward and from each other, of a shock absorber, said shock absorber comprising a casing secured to one of said members, two sets of eccentrically disposed friction disks carried by said casing, said disks having teeth around their peripheries, a double acting pawl coöperable with the teeth of said disks, and means for actuating said pawl upon relative movement between said members of the vehicle.

5. A shock absorber for vehicles and the like comprising, a supporting member, two sets of rotatably mounted friction disks, said disks having peripheral teeth, a train of gears interposed between the teeth of one set of disks and the teeth of the other set of disks whereby movement of one set is imparted to the other set, and a pawl adapted to coöperate with the teeth of either set of disks.

6. A shock absorber for vehicles and the like comprising, a casing, two sets of eccentrically disposed disks mounted within said casing, said disks having teeth, a train of gears interposed between the teeth of one set of disks and the teeth of the other set of disks whereby movement of one set is imparted to the other set, an oscillatable lever carried by said casing, a pawl pivotally supported on said lever and adapted to coöperate with the teeth of said disks.

7. A shock absorber for vehicles and the like comprising, a supporting member, two sets of eccentrically disposed friction disks rotatably mounted, said disks having peripheral teeth, a train of gears interposed between the teeth of one set of disks and the teeth of the other set of disks whereby movement of one set is imparted to the other set, and a pawl adapted to coöperate with the teeth of either set of disks.

8. A shock absorber for vehicles and the like comprising, a casing, two sets of eccentrically disposed friction disks mounted within said casing, said disks having teeth, an oscillatable lever carried by said casing, a pawl pivotally supported in said lever and adapted to coöperate with the teeth of said disks.

9. A shock absorber for vehicles and the like comprising, a casing, two sets of eccentrically disposed friction disks carried within said casing, said disks having peripheral teeth, a train of gears interposed between said sets of disks, and a double acting pawl adapted to coöperate with either set of disks.

10. A shock absorber for vehicles and the like, comprising, a casing, two sets of eccentrically disposed friction disks rotatably mounted within said casing, said disks having peripheral teeth, a train of gears interposed between said disks whereby movement of one set is communicated to the other set, an oscillatably mounted lever carried by said casing, a spring controlled double acting pawl mounted in said lever, said pawl being adapted to coöperate with either set of disks.

11. A shock absorber for vehicles and the like comprising, a casing, two sets of eccentrically disposed friction disks rotatably mounted within said casing, said disks having peripheral teeth, a train of gears interposed between said disks whereby movement of one set is communicated to the other set, an oscillatably mounted lever carried by said casing, a spring controlled double acting pawl mounted on said lever, said pawl being adapted to coöperate with either set of disks, and means for adjusting the amount of friction between said disks.

In witness that I claim the foregoing I have hereunto subscribed my name this 31st day of July, 1915.

JOHN F. O'CONNOR.